United States Patent [19]

Moorhead

[11] 3,709,063
[45] Jan. 9, 1973

[54] CHANGE SPEED TRANSMISSION

[76] Inventor: Walter H. Moorhead, 4939 Donald Avenue, Cleveland, Ohio 44143

[22] Filed: Feb. 16, 1971

[21] Appl. No.: 115,686

[52] U.S. Cl. ............................... 74/750, 74/798
[51] Int. Cl. ............................................ F16h 15/56
[58] Field of Search .............. 74/796, 798, 750, 205

[56] References Cited

UNITED STATES PATENTS

| | | | |
|---|---|---|---|
| 461,826 | 10/1891 | Fairchild | 74/205 X |
| 1,995,171 | 3/1935 | De Tar | 74/750 R X |
| 2,306,475 | 12/1942 | Wahl | 74/798 X |
| 2,536,803 | 1/1951 | Gleason | 74/798 X |
| 2,536,992 | 1/1951 | Chester | 74/796 X |
| 3,077,124 | 2/1963 | Juenke | 74/796 X |
| 1,190,662 | 7/1916 | Matteucci | 74/798 |

*Primary Examiner*—Milton Kaufman
*Assistant Examiner*—Thomas C. Perry
*Attorney*—Watts, Hoffmann, Fisher & Heinke

[57] ABSTRACT

A change speed transmission comprises rotatable input and output drive assemblies which are selectively connected by friction gearing to transmit power between an engine shaft and a driven device at different speed ratios. A body of one of the assemblies defines one direct drive friction gear member and part of an epicyclic friction gear unit. The other assembly carries a shifting member which is movable between one position for engagement with the direct drive friction gear member and a second position for engaging the epicyclic gear unit to provide a speed change between the drive assemblies.

4 Claims, 4 Drawing Figures

INVENTOR.
WALTER H. MOORHEAD

INVENTOR.
WALTER H. MOORHEAD
BY Watts, Hoffmann, Fisher & Heinke
ATTORNEYS

CHANGE SPEED TRANSMISSION

BACKGROUND OF THE INVENTION

1. Field of the Invention

The present invention relates to drive transmissions and more particularly relates to change speed drive transmissions utilizing friction gearing.

2. The Prior Art

Prior art proposals for transmissions associated with small horsepower engines in power lawn mowers, go-carts, motor bikes, etc. have been of various types. Most of these transmissions were of the friction drive type which enabled the transmissions to be disengaged without sophisticated clutching arrangements.

Many of these transmissions provided only a "-neutral" or disengaged condition and a single speed ratio. One common type was a belt transmission in which a pulley was movable to enable a drive belt to slip in order to disengage the transmission. In other transmissions centrifugally operated friction gears were employed. These transmissions were disengaged at low engine speeds and were gradually engaged as engine speeds increased. In other transmissions, friction disc type clutches were associated with centrifugally operated sprague-type clutches which provided speed responsive engagement.

Change speed transmissions which could be utilized on vehicles of the type referred to were generally sophisticated. Accordingly, the use of change speed transmissions in these vehicles has not been widespread because the improvement in performance of the vehicles has not been justified by the increased vehicle cost.

SUMMARY OF THE INVENTION

The present invention provides a simple, inexpensive and compact change speed transmission which is particularly adapted for use with small horsepower engines of the type used in power lawn mowers, go-carts, motor bikes, etc. In a preferred embodiment, the new transmission enables a driven device to be driven from an engine shaft through two speed ratios as well as providing a neutral or disengaged condition in which the driven device is disconnected from the engine.

The new transmission includes an input drive assembly, an output drive assembly, friction gearing between the assemblies and a shifting mechanism enabling the output drive assembly to be driven in a selected one of two speed ratios relative to the input member. The shifting mechanism also enables the input and output drive assemblies to be disconnected.

One of the drive assemblies includes a body member defining a friction gear member and a part of an epicyclic friction gear unit. The other drive assembly carries a movable shifting member which, when in one position, engages the friction gear member to provide a driving connection between the assemblies at one speed ratio. The shifting member is movable to a second position for engaging the epicyclic gear unit to establish a driving connection between the assemblies at a second speed ratio.

In one preferred construction, the epicyclic friction gear unit comprises a plurality of planetary rollers carried by a body which forms a cage for the rollers. The shifting member urges the rollers into frictional engagement with a stationary race so that the body is rotated. The rotational speed of the body is less than the rotational speed of the shifting member when the epicyclic friction gear unit is engaged. The body preferably forms part of the output drive assembly so that the epicyclic transmission provides a speed reduction between an engine output shaft and a driven device.

The body also forms the friction gear so that when the shifting member engages the friction gear part of the body, the planetating rollers free wheel while a direct drive is provided by the friction gearing.

The epicyclic friction gear unit can be constructed to provide various desired speed ratios between the input and output drive assemblies. In one preferred embodiment, the rollers are spherical bearing balls which provide a speed reduction of about one half speed. In another embodiment, wheel-like rollers are employed. These rollers provide sections having different diameters. These sections are engaged with different parts of the drive. This permits the speed ratio between the input and output assemblies to be determined by the selection of appropriate sized rollers.

In still another embodiment, the planetating rollers are engaged between tapered or conical surfaces. The speed ratio between the input and output assemblies is controllable by selection of roller diameters.

A principal object of the present invention is the provision of a new and improved change speed transmission for small horsepower engines which is of simple, compact construction and can be fabricated from inexpensive, easily obtained parts.

Other objects and advantages of the present invention will become apparent from the following detailed description of preferred embodiments made with reference to the accompanying drawings which form a part of the specification.

DETAILED DESCRIPTION OF PREFERRED EMBODIMENTS

Figure 1:
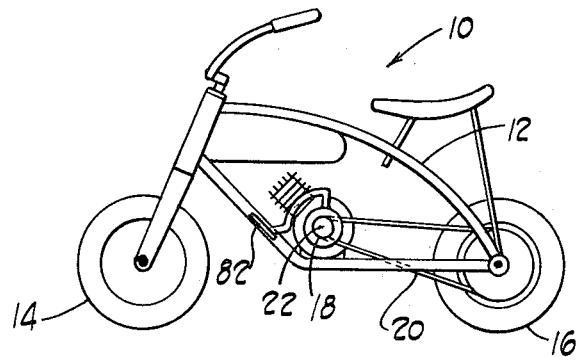
FIG. 1 is a side elevational view of a gasoline engine driven bike employing a transmission constructed according to the present invention.

A motor bike 10 embodying the present invention is illustrated in FIG. 1. The motor bike 10 comprises a frame 12 supported by dirigible ground engaging wheels 14, 16, and an internal combustion engine 18 supported on the frame which drives the rear wheel 16 via a chain drive 20. A transmission 22 embodying the invention is connected between the engine 18 and the chain drive 20. The motor bike 10 and associated elements, with the exception of the transmission 22, may be of any suitable or conventional construction and therefore are shown schematically and are not described in detail.

Figure 2:
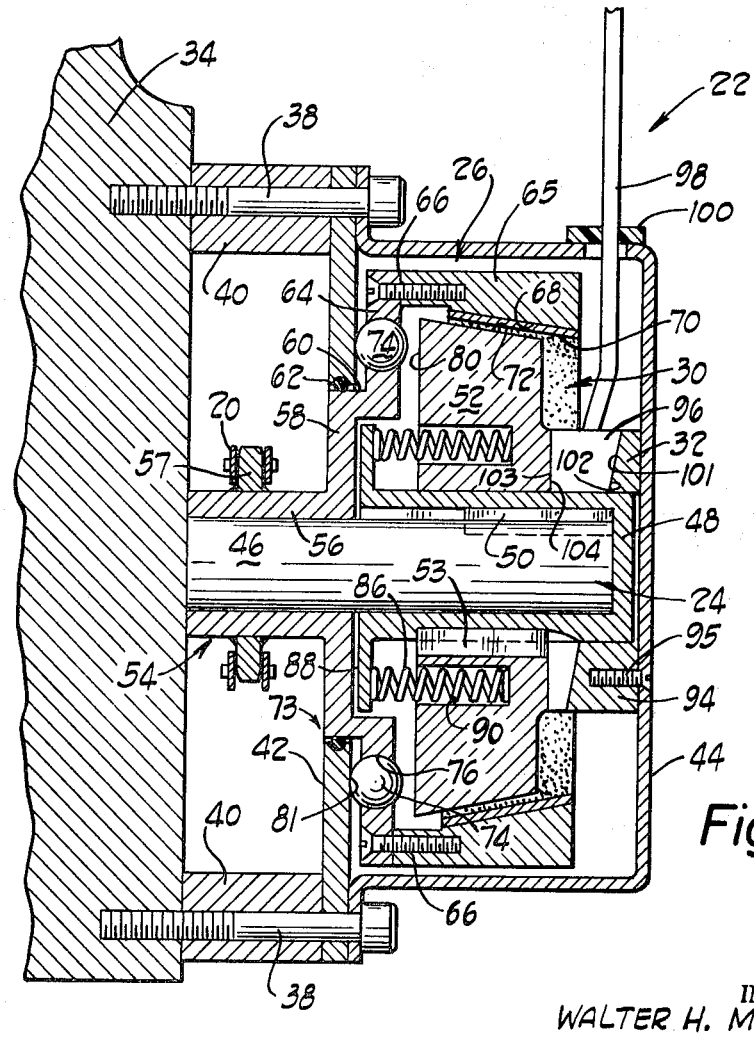
FIG. 2 is a cross sectional view of a change speed transmission embodying the present invention seen approximately from the plane indicated by the line 2—2 of FIG. 1.

The transmission 22 provides two forward speed ratios for the bike 10 as well as a neutral or disengaged condition in which the engine 18 is disconnected from the chain drive 20. Referring now to FIG. 2, the transmission 22 comprises an input drive assembly 24, an output drive assembly 26 and friction gearing generally designated at 30 by which the assemblies 24, 26 can be drivingly connected. A shifting mechanism, generally designated at 32, controls operation of the friction gearing 30 as is described in greater detail presently.

The transmission 22 is connected to the engine block 34 by screws 38 and standoffs 40. The transmission 22 defines a housing which comprises a rigid annular base plate 42 and a cup-like cover 44. The base plate 42 and cover 44 are connected to each other and to the engine block by the screws 38.

The input drive assembly 24 is connected to the engine output shaft 46 for rotation with the shaft in the transmission housing. The input assembly 24 comprises a cup-like bushing 48 connected to the engine shaft 46 by a key and keyway arrangement 50. The drive assembly further includes a shifting member or rotor 52 which is nonrotatably connected to the bushing 48 by suitable key and keyway arrangement 53. The shifting member 52 is axially movable relative to the bushing 48 by sliding along the key and keyway 53. If desired, the key and keyway 53 can be replaced by a spline or equivalent connection.

The output drive assembly is drivingly connected to the chain drive 20 and is rotatably driven by the input drive assembly via the gearing 30. The output assembly 26 comprises a body 54 having a sleeve 56 which projects from the housing towards the engine block 34 and surrounds the engine shaft 46. A drive sprocket 57 for the chain is carried by the sleeve 56 so that when the body 54 rotates, the chain is driven by the sprocket. A flange 58 extends radially from the body 54 towards the inner periphery of the base plate 42. A shoulder 60 is formed in the flange 58 adjacent the inner periphery of the base plate 42 and a running seal 62 is provided between the flange shoulder 60 and the base plate to seal the interior of the housing. An annular flange part 64 extends radially outwardly from the shoulder 60. The body 54 further includes an annular friction gear ring 65 which projects axially from the flange 58 into the housing.

The friction gear ring 65 cooperates with the shifting member 52 on the input drive of the assembly to provide a direct drive friction gear connection between the input and output drive assemblies. The ring 65 abuts the flange part 64 and is connected to the flange part by screws 66. The ring 65 has a generally conical internal surface 68 which surrounds the shifting member 52 and which carries suitable friction material defining an internal conical friction surface 70. As is shown in FIG. 2, the conical surface 70 on the friction gear ring converges proceeding away from the direction of the engine block 34. The shifting member 52 has a generally conical outer surface 72 which converges in the same direction as the surface 70 of the ring 65 so that when the shifting member 52 is moved towards the right as viewed in FIG. 2, the conical surfaces 70, 72 mate to establish a direct friction drive between the shifting member 52 on the input assembly and the ring 65 of the output assembly. When this friction drive relationship is established, the sprocket 57 rotates at the same angular velocity as the engine shaft 46.

The body 54 also defines an output drive member of an epicyclic friction gear unit 73. The epicyclic friction gear unit 73 in the preferred embodiment is operable to provide a speed reduction between the engine shaft 46 and the sprocket 57 and includes a plurality of planetary rollers 74 which are spaced circumferentially about the flange part 64 in openings 76 in the flange part. When the friction surfaces 70, 72 are drivingly connected, the body 54 rotates with the rollers 74 freewheeling on the base plate. The rollers 74 of FIG. 2 are bearing balls which are confined in the flange part 64 by spherical boundaries of the openings 76.

The shifting member 52 defines an annular pressure face 80 confronting the rollers 74. When the shifting member 52 is moved to the left as seen in FIG. 2, the pressure face 80 engages the rollers 74 and forces the rollers against a stationary annular bearing surface portion 81 on the base plate 42. Friction forces between the rollers and the surface 81 cause the rollers to roll on the surface 81 and the drive from the engine output shaft 46 is transmitted through the shifting member 52 to the rollers 74. When adequate pressure is established, the rollers 74 orbit about the engine output shaft 46 at one half of the rotational speed of the shifting member 52. Consequently the cage formed by the body 54 is driven by the rollers at about one half of the engine speed. Accordingly, the body 54 drives the sprocket 57 at a maximum of one half of the angular velocity of the engine shaft.

The transmission 22 also provides a neutral or disengaged condition in which the sprocket 57 is disconnected from the engine output shaft 46. This condition occurs when the shifting member 52 is between its positions engaging the friction gear ring 65 and the rollers 74 of the epicyclic gear unit 73. In operation, the shifting member 52 is moved to its neutral condition for starting the engine. When the engine has started, the shifting member 52 is moved to engage the rollers 74 to provide a "low" gear for the motor bike. The epicyclic gear unit 73 is gradually engaged so that the bike 10 gradually accelerates. When the bike has attained a desired speed, the shifting member 52 is moved to the right to engage the surfaces 70, 72 of the direct drive friction gearing. The bike 10 is thereafter propelled in the high gear range.

The shifting member 52 is operated between its positions by the shift mechanism 32. In a preferred embodiment, the shift mechanism 32 includes a foot operated shifting pedal 82 (FIG. 1) which, when released, provides for a normally direct drive from the engine shaft to the sprocket. When the pedal 82 is released, the shifting member 52 is urged into engagement with the ring 65 by biasing springs 86 which are preferably compression springs engaged between a radial flange 88 on the bushing 48 and sockets 90 in the shifting member 52. The compression springs 86 provide sufficient pressure to assure tight frictional engagement between the shifting member 52 and the ring 65.

When the pedal 82 is depressed, the shifting member 52 is shifted to the left as seen in FIG. 2 against the bias of the springs 86 and away from the gear ring 65. In the preferred embodiment, the member 52 is shifted by a cam assembly including a stationary cam plate 94 which is connected to the cover 44 by screws 95. The pedal 82 is fixed to an annular rotatable cam member 96 by a pedal support arm 98 which extends into the housing through a cover 44 through a suitable dust seal 100. The cam plate 94 and the cam member 96 each have mating circular inclined plane cam sections which define engaged cam faces 101, 102.

When the pedal is depressed, the cam member 96 rotates relative to the cam plate 94 resulting in the cam member 96 moving toward the left as seen in FIG. 2. The cam member 96 has a bearing face 103 which engages the face 104 on the shifting member 52 so that when the cam member 96 moves the shifting member 52 is likewise moved to the left toward engagement with the epicyclic gear unit 73. As soon as the shifting member 52 moves away from engagement with the ring 65, the transmission is in its neutral position. As the pedal is further depressed, the shifting member 52 moves to engage the epicyclic gear unit resulting in the sprocket 57 being driven in the "low" gear range. The downward pressure on the pedal determined the pressure of engagement between the shifting member 52 and the rollers 74.

Figure 3:
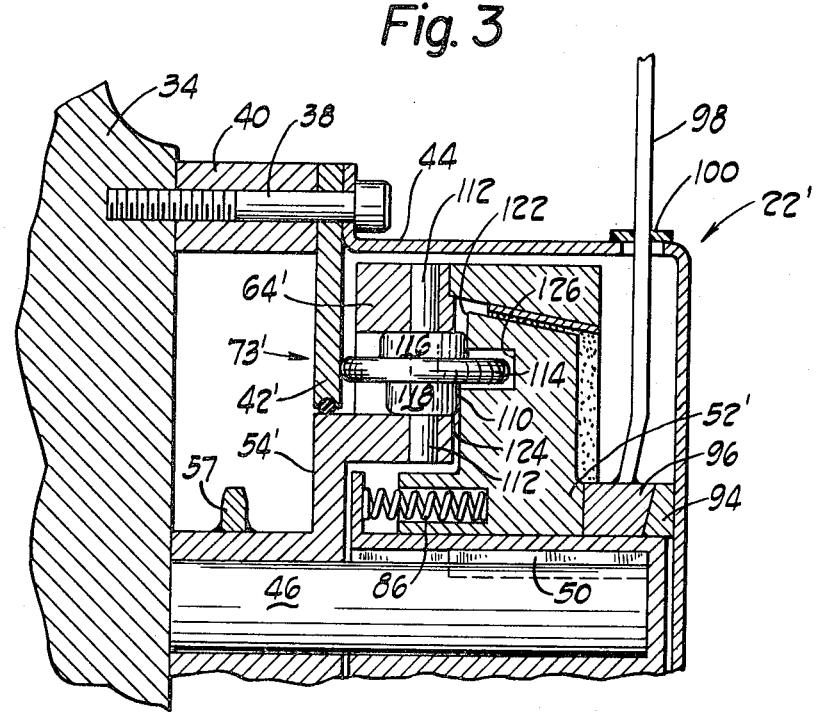
FIG. 3 is a fragmentary cross sectional view of a modified transmission embodying the present invention; and, FIG. 4 is a fragmentary cross sectional view of a further modified transmission embodying the present invention.

FIG. 3 shows another preferred embodiment of a transmission constructed according to the invention. The transmission which is illustrated in FIG. 3 employs a modified epicyclic drive unit but is otherwise similar to the transmission illustrated and described in reference to FIGS. 1 and 2. Similar parts are therefore indicated by corresponding primed reference characters. The transmission 22' of FIG. 3 employs a modified body 54' having a relatively heavy radially extending flange part 64'. An epicyclic gear unit 73' includes a plurality of planetating roller members 110 which are supported by radially extending axle shafts 112 connected in the flange part 64'. Each of the roller members 110 defines a wheel part 114 and hubs 116, 118 extending from opposite radial sides of the wheel 114. The rollers 110 are rotatable with respect to the axle shafts 112 and the wheel part 114 rides on the baseplate 42' while the hubs 116, 118 ride on pressure surfaces of the shifting member 52'. The shifting member 52' defines a pair of pressure faces 122, 124 at opposite sides of an annular groove 126 extending about the axis of rotation of the shifting member 52'. The wheel part 114 extends into the groove 126 and short of the base of the groove so that the wheel part rides solely on the base plate. The pressure faces 122, 124 on either side of the groove 126 engage the hubs 116, 118 respectively.

The hub 116 has a larger diameter than the hub 118 and the pressure face 122 is spaced axially from the plane of the pressure face 124. In this fashion the difference in angular velocity between the pressure faces 122, 124 are accommodated and the roller members 110 are rotated by the shifting member 52' without slipping between the pressure faces 122 or 124 and the hubs 116, 118 respectively. Slipping might otherwise occur because of the difference of distance from the center of rotation of the shifting member 52' between the pressure faces.

The use of roller members 110 enables the gear reduction between the engine shaft and the sprocket to the controlled according to the diameters of the wheel part 114 and the hubs 116, 118. Accordingly, it should be apparent that changing the configuration of the roller 110 will provide different ratios as may be desired for the equipment for which the transmission is associated.

Figure 4:
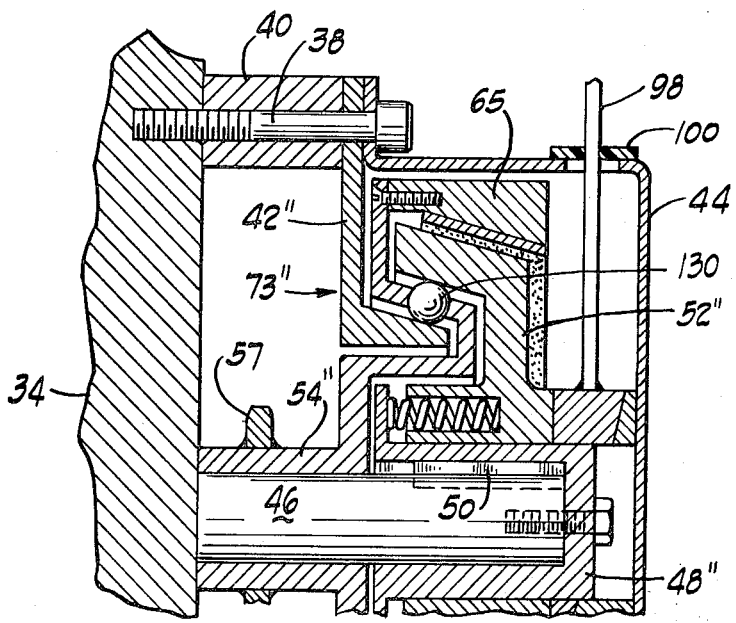

FIG. 4 is a partial fragmentary view of still another modification of a transmission embodying the invention. Modified parts corresponding to parts referred to above are shown by similar double primed reference characters. The epicyclic friction gear arrangement of FIG. 4 employs a plurality of circumferentially spaced ball type rollers 130 which are disposed between conical pressure surfaces 132, 134 formed on the base plate 42'' and shifting member 52'', respectively. The gear reduction provided by the epicyclic gear unit 73'' can be altered by changing the diametral size of the balls carried by the body 54''. As the diametral size of the rollers is increased, the speed reduction through the gear unit 73'' is reduced. The remaining parts of the transmission 22'' of FiG. 4 are similar in function and construction to corresponding parts described above and therefore are not described in further detail.

Although more than one embodiment of the invention has been illustrated and described, the present invention is not to be considered limited to the precise constructions shown. Other adaptations, modifications and uses of the invention may become apparent to persons skilled in this art and it is the intention to cover all such adaptations, modifications and uses which come within the scope of the appended claims.

What is claimed is:
1. A transmission comprising:
   a. a housing;
   b. an input member supported by said housing and rotatable about an axis extending through said housing;
   c. an output member rotatable about said axis;
   d. one of said members being surrounded by at least a portion of the other member; and,
   e. a change speed transmission means for transmitting drive from said input member to said output member comprising;
      1. a shifting member surrounding a portion of said one of said input or output members;
      2. connecting means between said shifting member and said one input or output member for preventing relative rotation between said shifting member and said one input or output member and enabling sliding movement of said shifting member relative to said one input or output member parallel to said axis;
      3. said shifting member defining at least first and second drive transmitting faces at spaced locations thereon;
      4. epicyclic friction drive means comprising a plurality of planetary roller elements rotatably supported by the other input or output member, a stationary bearing face supported by said housing for engagement by said roller elements, said shifting member movable axially relative to said input and output members to a first position for engaging said roller elements between said bearing face and one of said first and second drive transmitting faces whereby drive is transmitted from said input member to said output member with said input and output members rotating at different angular speeds;

5. friction drive means comprising a friction surface supported by said other input or output member and the other of said first and second drive transmitting faces, said shifting member movable axially relative to said input and output members to a second position for engaging said other drive transmitting face with said friction surface to transmit drive from said input member to said output member with said input and output members rotating at the same angular speed when said friction surface engages said other drive transmitting face without slipping; and, 6. actuator means for effecting movement of said shifting member axially relative to said input and output members between said first and second positions, said actuator means also effective to position said shifting member axially between said first and second positions to interrupt drive transmission between said input and output members.

2. The transmission claimed in claim 1 wherein said actuator means comprises spring means supported by said one of said input or output member for rotation therewith and with said shifting member, said spring means reacting between said one input or output member and said shifting member to urge said shifting member axially relative to said input and output members toward one of said first and second positions.

3. The transmission claimed in claim 2 wherein said actuator means further comprises cam means comprising a first cam face fixed against rotation with respect to said housing, a cam member comprising a second cam face engaging said first cam face and rotatably movable with respect to said housing and said first cam face, and a speed changing member connected to said cam member for rotating said cam member relative to said first cam face, one of said cam faces axially movable relative to said input and output members for effecting axial movement of said shifting member.

4. A transmission as claimed in claim 1 wherein said roller members are supported for rotation with respect to said other input or output member about planetary axes extending radially from said axis, each roller member comprising at least first and second cylindrical portions having different diametrical extents, one of said portions engageable with said bearing face and the other of said portions engageable with said one of said first and second drive transmitting faces.

* * * * *